United States Patent [19]
Duca et al.

[11] 4,392,156
[45] Jul. 5, 1983

[54] VIDEO KEY EDGE GENERATOR FOR INCREASING THE SIZE OF AN ASSOCIATED BORDER, DROP SHADOW AND/OR OUTLINE

[75] Inventors: James F. Duca, Evergreen; Jerry A. Moline, Arvada, both of Colo.

[73] Assignee: Ampex Corporation, Redwood City, Calif.

[21] Appl. No.: 260,544

[22] Filed: May 4, 1981

[51] Int. Cl.³ .............................................. H04N 5/22
[52] U.S. Cl. .................................................... 358/183
[58] Field of Search ................. 358/183, 181; 340/790

[56] References Cited
U.S. PATENT DOCUMENTS

| | | | |
|---|---|---|---|
| 3,941,925 | 3/1976 | Busch | 358/183 |
| 3,943,280 | 3/1976 | Kimura | 358/183 |
| 4,141,041 | 2/1979 | Peters | 358/183 |
| 4,199,788 | 4/1980 | Tsujimura | 358/183 |

OTHER PUBLICATIONS

Ampex—Series 4000 Production Switcher, Ampex Catalog No. 1809376-01, Nov. 1979.

*Primary Examiner*—Tommy P. Chin
*Attorney, Agent, or Firm*—Joel D. Talcott; George B. Almeida

[57] ABSTRACT

Conventional border, drop shadow and/or matte outline generating signals are selectively gated through an offset amplifier of less than unity gain and then fed back into the existing delay lines, to selectively modify the horizontal and vertical trailing edge of the waveform generated by the loop, which, in turn, modifies accordingly the selectively switched composite video signal, i.e., provides for selectively increasing the size and/or varying the configuration of the luminance key signals.

11 Claims, 5 Drawing Figures

FIG_1

PRIOR ART

FIG_2

FIG_3

FIG. 5

VIDEO KEY EDGE GENERATOR FOR INCREASING THE SIZE OF AN ASSOCIATED BORDER, DROP SHADOW AND/OR OUTLINE

BACKGROUND OF THE INVENTION

The invention relates to video key border generators, and particularly to a border generator capable of adding full or drop shadow borders, or outlines, of selectively increased sizes, to key signals.

Video production switchers are employed as part of modern television production processes to provide video signal mixing and special effects techniques. These techniques, in turn, allow the transition between video information from various picture sources by processes known as "mixing" or "wiping", or are used to process various video information to form a composite picture by means of electronic "keying" operations. Typical of such switcher apparatus is the Ampex Series 4000 production switcher shown, for example, in the Ampex Catalog No. 1809376-01, November 1979.

In the course of performing the various mixing, wiping and/or keying processes, picture definition, i.e., transitions in the picture, must be clearly emphasized. This is particularly true when keying in captions and other graphics. The emphasized picture definition is effected by the symmetrical or unsymmetrical bordering of the caption, video information, etc., with selected brightness, or by coloring various portions of the picture as, for example, the caption characters.

To provide such bordering, or edge effects, the video signal covering the keying signal is generated via a corresponding portion of the keying circuit, such as conventionally found in the mix/effects unit of a switcher. Thus, the given border effect is accomplished by selectively widening the keying signal in the vertical direction by means of a delay of two horizontal lines using successive ultrasonic 1H delay lines, and in the horizontal direction by means of a delay of two picture elements or pixels. In the case where a full border is being generated, the insert video signal itself must be delayed by one-half of these values, In the vertical and horizontal directions, to provide a symmetrical border of a single line width about all sides of the video insert. It is also possible to key into the background image, the outlines produced from the difference between the enveloping signal and the keying signal, and to provide picture emphasis by colorizing as by a matte outline. For colorizing captions, etc., each mix/effects unit employs a color background generator whose signal is supplied to the keying stage as insert video.

Such conventional video border generator systems have the major disadvantage of being unable to increase the size, or change the configuration, of a full or drop shadow border, or outline.

SUMMARY OF THE INVENTION

The invention overcomes the shortcomings of the prior art border generating systems by providing the capability of selectively increasing the size, and thus of desirably changing the configuration, of a full or drop shadow border or an outline, utilizing a feedback and gating technique.

To this end, the invention border generator includes an OR gate between the incoming video signal and the first 1H delay line, and an offset amplifier of less than unity gain, e.g., 0.95, coupled in a feedback path to the second input of the OR gate via a switch. Additional switch means are disposed in the picture element delay line path, which switch means in part allow the selection of one of the border, drop shadow or outline modes of border generation. Thus, the size and configuration of the edge effects around preselected video may be selectively increased in the horizontal and/or vertical directions by selective feedback of the input video signal through the existing delay paths conventionally used to provide the usual horizontal and vertical border effect.

Thus it is an object of the invention to provide an improved border generating circuit integral with a switcher apparatus, for selectively increasing the size, and/or change the configuration, of a full or drop shadow border, or outline.

Another object is to provide an improved border generating circuit utilizing a feedback and gating technique to generate increased and/or decaying edge effects.

A further object is to provide an improved border generating circuit wherein a conventional input video signal is selectively fed back into existing delay lines via an offset amplifier of less than unity gain.

Still another object is to modify the selectively switched composite video by correspondingly modifying the horizontal and vertical trailing edges of the loop video waveform generated via the feedback and gating circuitry.

DESCRIPTION OF THE PREFERRED EMBODIMENTS

Figure 1:
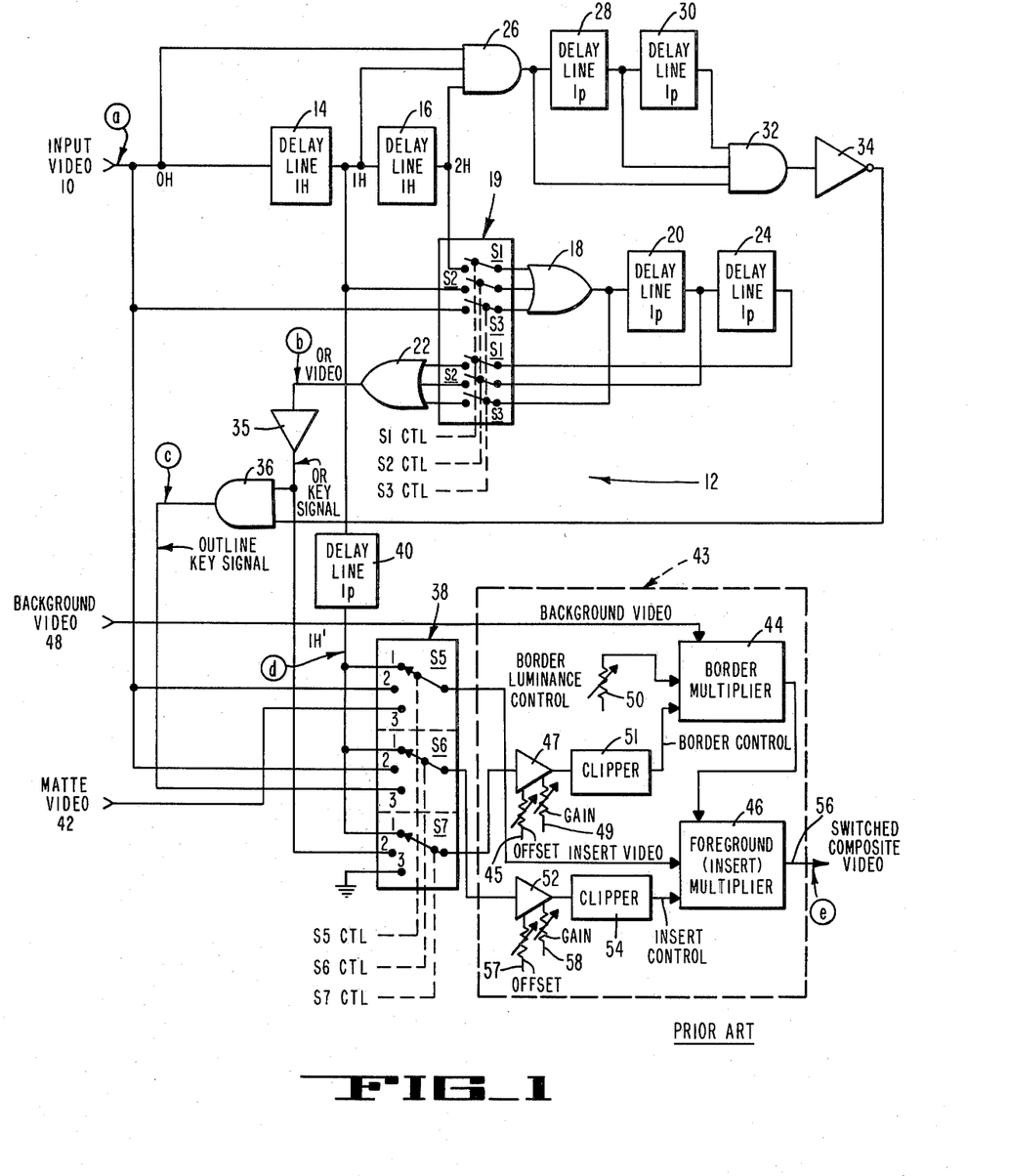
FIG. 1 is a schematic diagram depicting a prior art video border generator whose function is further described with respect to FIGS. 3A and 3E.

Referring to FIG. 1, an input video signal corresponding, for example, to the composite video signal which may be inserted into given background video, is supplied at circuit point a to an input terminal 10 of a prior art video key border generator system 12, and particularly to a first one horizontal line (1H) delay line 14. The input video signal may be titles, captions or any other graphics as generated by a title camera or a graphics generator, i.e., may be a desired video signal from any video camera. The 1H delayed signal is fed to a second 1H delay line 16, and the resulting 2H delayed signal is fed to an OR gate 18, along with the 1H delayed signal and the undelayed input video signal. The OH (i.e., undelayed input video), 1H and 2H delayed video signals are fed to the OR gate 18 via switch means 19 formed of a first set of switches termed S1, S2 and S3.

OR gate 18 is coupled to a delay 20 of approximately 150 nanoseconds (ns), i.e., a delay of a picture element or pixel (1p) in the NTSC color television standard, and thence to another 1p delay 24. The OR gate 18 and the delays 20, 24 are coupled at their respective outputs to an OR gate 22 via a second set of switches S1, S2, S3 of switch means 19. The terms S1 CTL, S2 CTL and S3 CTL are used herein to define the control commands for switching the respective pairs of switches S1, S2, S3 between their on/off positions. The output of the OR gate 22 is herein termed the OR video at the circuit point b.

An AND gate 26 receives the input signal on terminal 10 as well as the signals from the 1H and 2H delay lines 14, 16. AND gate 26 is coupled to successive 1p delay lines 28, 30, as well as to an AND gate 32. The outputs of the delays 28 and 30 also coupled to the AND gate 32. The latter is coupled to an inverter 34 and thence to an AND gate 36. The OR video signal of OR gate 22 is fed to a buffer 35 and the resulting OR key signal is fed to a second input of the AND gate 36. The output of the AND gate 36 is herein termed the outline key signal at the circuit point c.

An output switch means 38 includes three sets of contacts of respective switches herein termed S5, S6 and S7. The three contact positions of each set are numbered 1, 2, and 3, and the switch positions are determined by respective position control commands S5 CTL, S6 CTL, S7 CTL. The 1H delayed signal from delay line 14 also is fed to a 1p delay line 40 and the resulting 1H plus 1p combined delay, viz, 1H', is fed via circuit point d to the positions 1 of the contact sets S5, S6 and S7. The OR key signal output of the buffer 35 is coupled to position 2 of the contact set S7, while the outline key signal of the AND gate 36 is coupled to position 3 of the contact set S6. The positions 2 of contact sets S5 and S6 are coupled to the undelayed input video signal from terminal 10. Finally, contact position 3 of the set S5 is coupled to a matte video signal via a terminal 42, and contact position 3 of the sets S7 is suitably grounded.

Multiplier means 43, integral with the switcher apparatus herein is depicted as a border multiplier circuit 44 coupled in turn to a foreground, i.e., insert, multiplier circuit 46. Although successive multiplier circuits are depicted herein, it is to be understood that the multiplying functions are actually performed in parallel in generally conventional fashion. The common side of the contact set S7 provides a border control signal to the multiplier circuit 44, via an offset amplifier 47 with offset and gain controls 45, 49 respectively, and a clipping circuit 51. Circuit 44 also receives a background video signal via a terminal 48, and a border luminance control input thereto via a border control potentiometer 50. The latter provides for varying the luminance level of the border. The foreground multiplier circuit 46 is coupled to a foreground, i.e., insert video signal via the common side of contact set S5, and to an insert control or key signal via the common side of contact set S6, an offset amplifier 52 with offset and gain controls 57, 58 respectively, and a clipping circuit 54. The foreground multiplier circuit 46 provides the selectively switched composite video signal via output terminal 56, i.e., circuit point e, which composite video signal corresponds to the inserted foreground video signal with a selected border effect, background video signal with selected outline effect, etc.

For example, in the border mode, the output video signal includes the video insert with a full 1H delay border in the vertical direction, and a full 1p delay border in the horizontal direction, as conventionally generated by the prior art circuit of FIG. 1 and depicted in FIG. 3A, and further described below.

Figure 2:
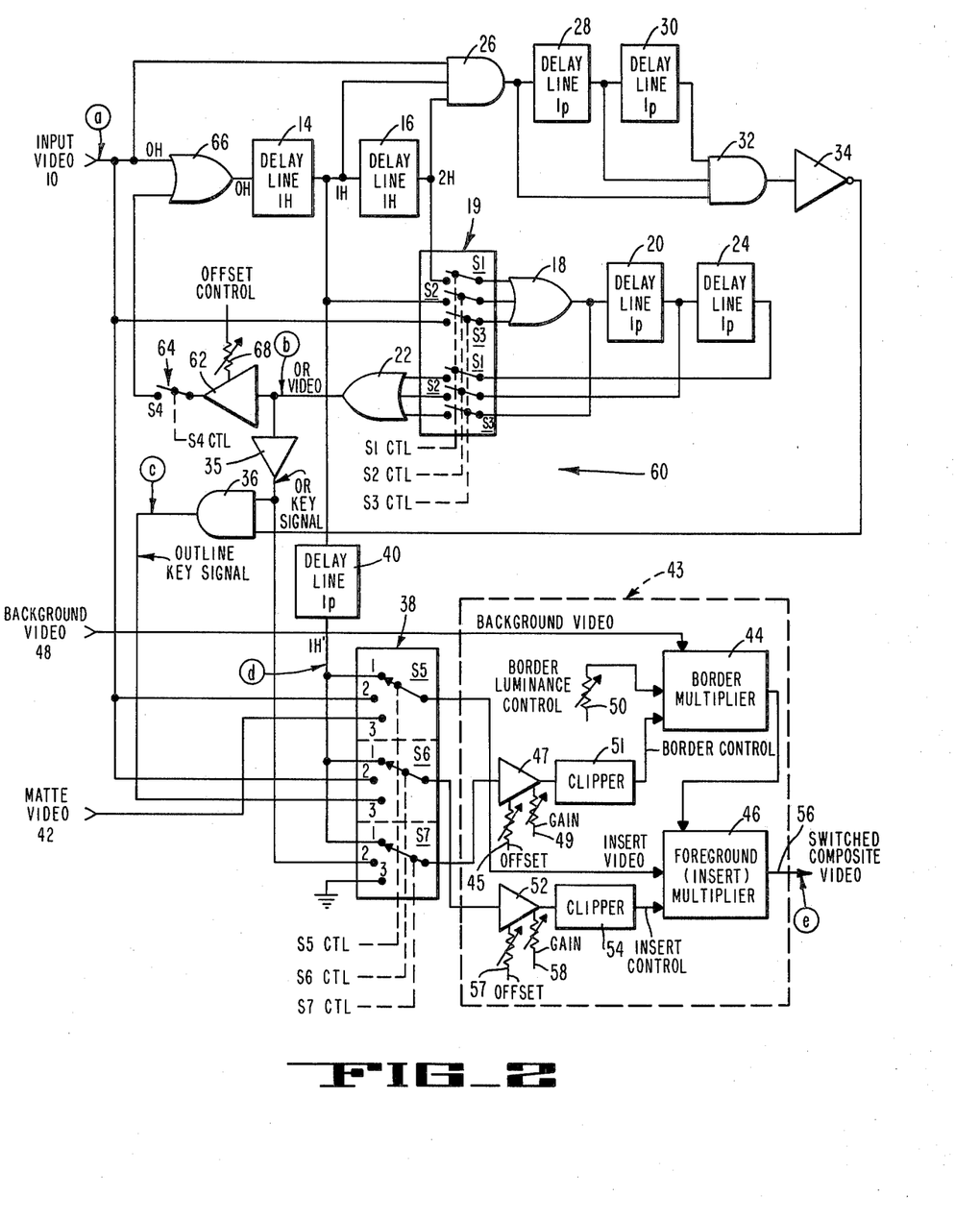
FIG. 2 is a schematic diagram depicting the video border generator of the invention combination, whose function is further described with respect to FIGS. 3B, 3C, 3D and 3F.

FIG. 2 depicts a video key border generator system 60 of the invention combination utilizing in large part the prior art system 12 of FIG. 1, wherein similar components ae similarly numbered. However FIG. 2 further includes the OR gate 22 coupled at its output to an offset amplifier 62, to a switch means 64 (Switch S4) and thence to one input of an OR gate 66. The latter OR gate is also coupled, at the second input thereto, to the input video signal on terminal 10, and at its output to the first 1H delay line 14. The offset amplifier 62 has a gain less than unity and includes an offset adjustment via an offset control 68. More particularly, the amplifier 62 has a gain range of the order of from 0.95 to 0.99 and will offset $-5\%$ to $-50\%$ of the peak-to-peak video level. The contact position of switch S4 is controlled via a contact position control S4 CTL.

Figure 4:
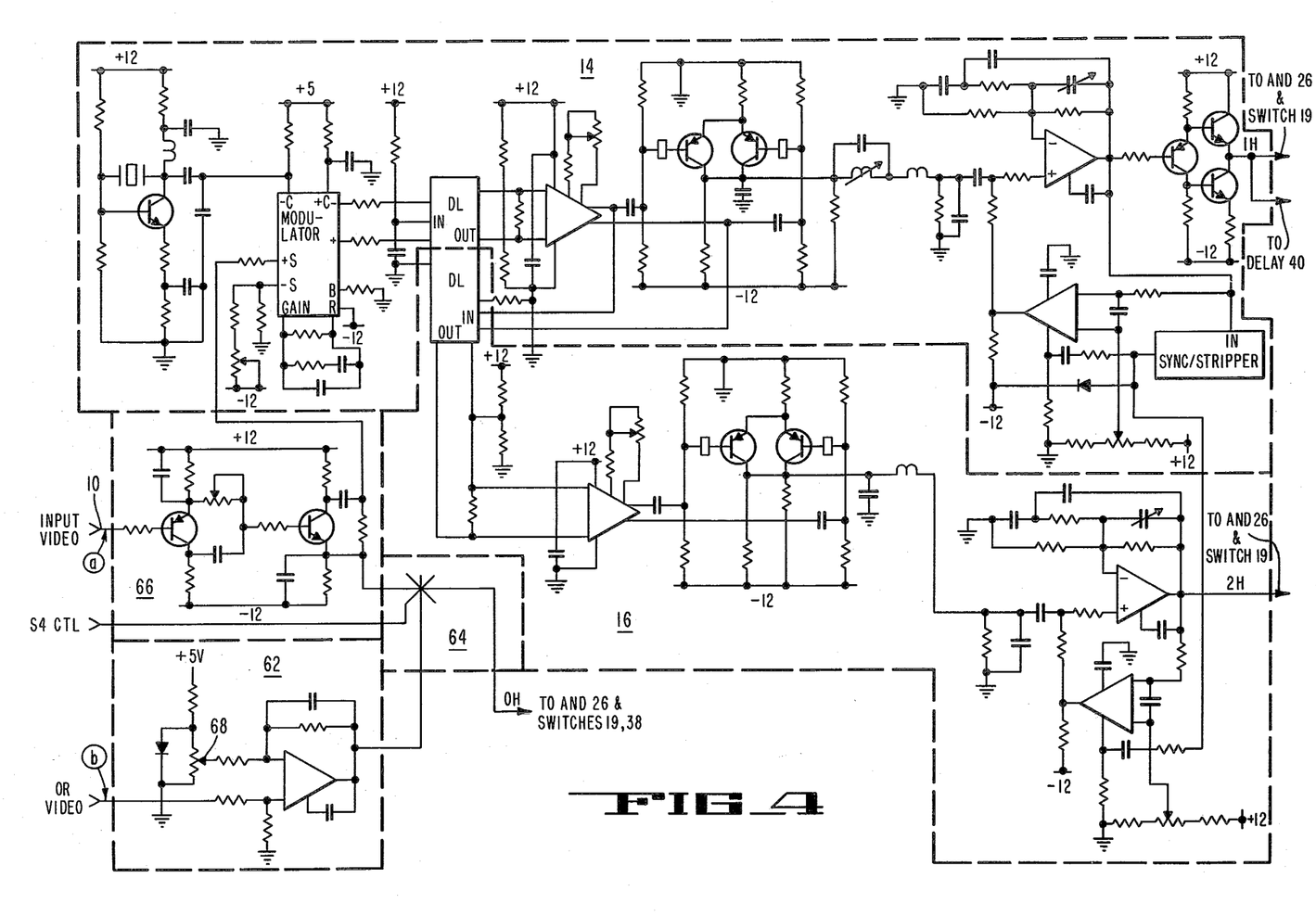
FIGS. 4 and 5 are schematic diagrams of the circuit of FIG. 2 in combination with conventional portions of the switcher apparatus.
Figure 5:
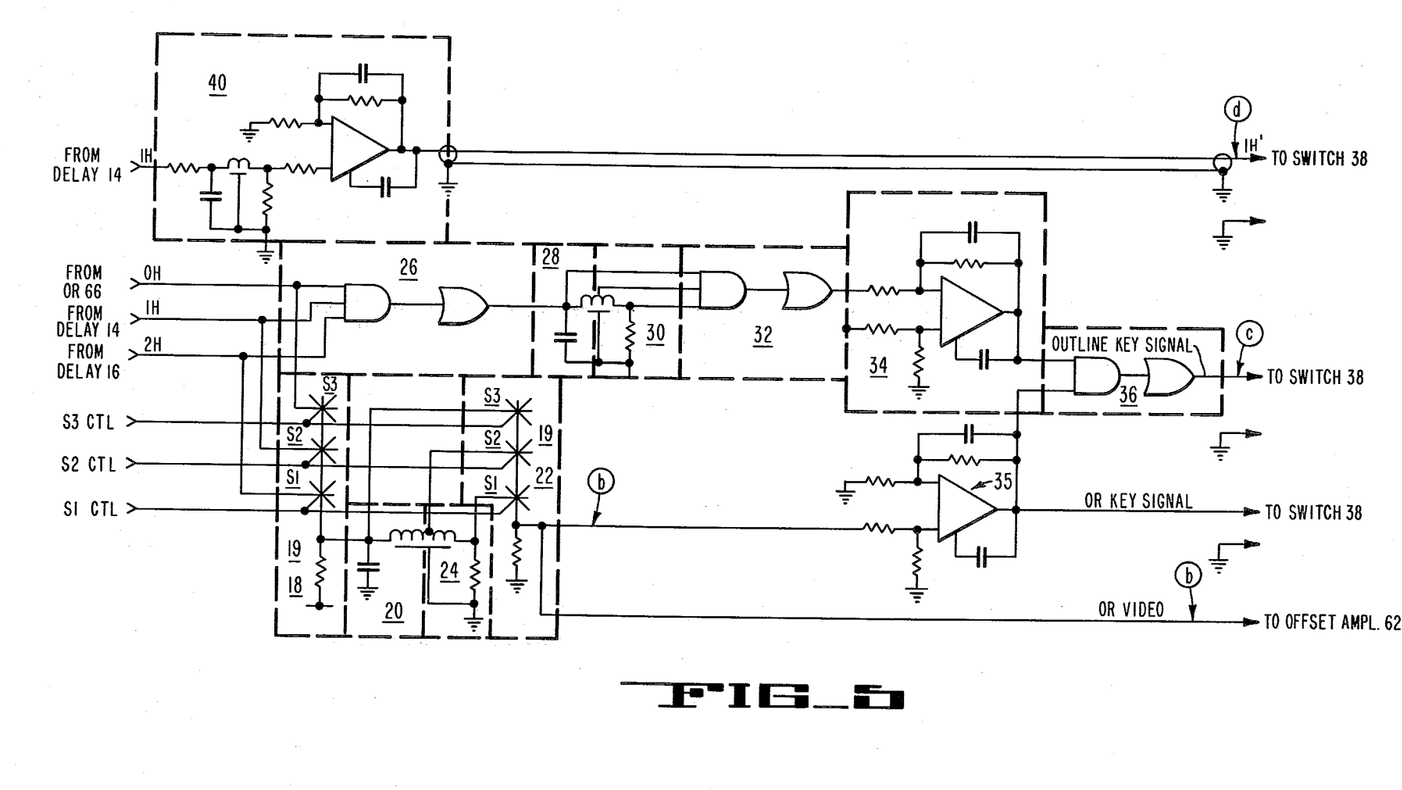

Although the switch means 19, 38 and 64 are herein depicted as specific switches within the border generator systems, it is to be understood that the switching is effected via the conventional crosspoint circuits of the switcher apparatus as depicted in FIGS. 4 and 5. For example, the first set of switches S1, S2, S3 of means 19 combine with respective OR gates 18 to define the three respective crosspoint switches in FIG. 5. The same is true of the second set of switches S1, S2, S3 of means 19 combined with OR gates 22. Further the control commands S1 CTL through S7 CTL for the respective crosspoint switches are provided by the central logic units (not shown) of the switcher apparatus in response to the usual requests for specific switcher functions, e.g., full or drop shadow border, outline, etc., requests.

It may be seen that the invention system 60 of FIG. 2 includes thus a feedback loop extending from the OR gate 22 to the input of the first 1H delay line 14, and provides successive feedback cycles of diminishing amplitude, and thus successively increasing delays when generating the keying signals. That is, the OR video signal is delayed an additional horizontal line time vertically and a pixel time horizontally each time it is fed back, whereby its level successively declines in response to the amount of offset applied to the amplifier 62. The extent of offset in the feedback process determines the slope of the decay and thus contributes to the increase of the size of the border, drop shadow and/or matte outline about the right and bottom sides of the insert or background video signal.

As may be seen, the type of edge effect generated by either of the systems of FIGS. 1 and 2 is determined by the positions of the switch means 19, 38 (and also means 64 in FIG. 2) which, in turn, determines which insert or background video signals are used as well as the manner in which they are applied to the multiplier means 43. Thus, when the switch S4 of FIG. 2 is closed, the feedback loop technique is employed to increase the size of the border, drop shadow or outline in accordance with the invention. The positions of the switch means 19 determine which of the input signals 0H, 1H and/or 2H are used in the feedback path, and what single or combination of OR functions are used in the border control. In combination with the feedback loop and switch means 19, the positions of the output switch means 38 determine which of the undelayed and/or delayed feedback video signals are applied to the foreground multiplier circuit 46, and which are used as key signals by the border and foreground multiplier circuits 44, 46. The type of edge effect generated is thus dependent upon which video signal is inserted as fill or maintained as background, and which is used to control the multiplier circuits 44, 46.

Accordingly, referring to FIGS. 3A-3F, the various vertical columns of the successive graphs compare various operating conditions and the resulting types of edge effects generated during the border, drop shadow and outline modes of operation of the border generating systems of FIGS. 1 and/or 2. Thus, the columns depict for each mode of operation; the contact positions for the switch means hereinafter respectively referred to as S1, S2, S3, S4, S5, S6, and S7; the waveforms generated at selected circuit points a, b, c, d and e along the circuits of either system; and the resultant edge effects generated in the final output corresponding to the selectively switched composite video signal. Thus, by way of example, the prior art border generator 12 of FIG. 1 generates the conventional border and matte outline effects shown in FIGS. 3A and 3E, as determined by the type of edge effect desired and the corresponding contact positions of the switch means 19 and 38. In addition, the FIG. 3C depicts switch settings and border effects, viz, a drop shadow effect, which does not utilize the feedback loop technique of the invention, but which is an improvement on the conventional prior art drop shadow effects since it includes a visible step between the insert video signal and the start of the drop shadow.

Thus, referring to the prior art system 12 and FIGS. 1 and 3A, when the switches S1, S2, S3 are all "on", switch S4 is "off", the switches S5, S6 are in positions 1, and switch S7 is in position 2, the specific video signal with full 1H and 1p delay borders is generated as depicted in FIG. 3A at numeral 70. The top left corner of the border begins at time $t_o$, i.e., at the beginning of the key signal, and the insert video signal is delayed 1H and 1p to begin at time $t_o+1H+1p$. The horizontal delay is shown via the waveform 71 in FIG. 3Ad as $t_o+1p$ (since the waveforms column depicts only the horizontal waveforms).

Thus in conventional fashion, the insert video signal is bordered on the top and bottom by one horizontal line delay, and on each side by a one pixel delay, i.e., has a full border with the insert video of 1H'. The 1H' signal is generated at point d of FIG. 1 and is fed to the foreground multiplier 46 via switches S5, S6, and thus is utilized as both the insert video and the insert key signals respectively.

Likewise, when generating a matte outline effect (FIG. 3E) via the prior art system of FIG. 1, the switches S1, S2, S3, S4 are set to "off", "on", "off" and "off" respectively, and switches S5, S6, S7 are all switched to the contact positions 3. The ANDed function of the 1H plus 1p delays, corresponding to the outline key signal, is used to control the insert key via the position 3 of the switch S6 and the foreground multiplier circuit 46. The border control signal is grounded via switch S7 and thus the background video signal is fed through the border multiplier circuit 44 to the foreground multiplier circuit 46. The matte video signal is supplied via the switcher apparatus and the terminal 42 and switch S5 as the insert video signal. As a result the switched composite video signal output corresponds to the matte outline 72 disposed about the background video as shown in FIG. 3E.

With regards to the border generator system of the invention as depicted in FIG. 2, FIG. 3B exemplifies the generation of decaying insert of increased size with the insert video signal at 1H' delay; FIG. 3D exemplifies a drop shadow of increased size and a hard edge, with the insert video signal at zero delay; and FIG. 3F exemplifies a matte outline of increased size and a hard edge. FIG. 3C depicts a somewhat unusual drop shadow effect which, however, is generated whithout employing the feedback techniques of the invention combination and is shown by way of example only. The increase in size and change of configuration in the three modes of FIGS. 3B, 3D and 3F, is provided by the feedback loop of the invention, i.e., by the use of the repeated feedback technique via the offset amplifier 62, the switch S4, the OR gate 66, and the corresponding settings of the switch means 19 and 38.

Thus in FIG. 3B, the switches S1, S2, S3 of FIG. 2 are "off", "on" and "off" respectively, the switch S4 is closed and the switches S5, S6, S7 are set to positions 1, 1 and 3, respectively. The system provides the waveforms which are depicted at FIG. 3Ba-3Be as generated at the various circuit points a, b, c, d, e of FIG. 2. Thus at point d and the corresponding waveform of FIGS. 2 and 3Bd respectively, a waveform 74 depicts the key signal corresponding to the hole cut by the insert key in the background video signal received via terminal 48, and is the area of the video picture which is to be filled by the insert video signal. At point d, the insert video signal is shown delayed by a pixel in the horizontal direction by the delay line 40, and by one horizontal line in the vertical direction by delay line 14. The OR video signal at FIG. 3Bb decays as shown at 76 at the end of the input video waveform due to the successive offset of the video signal feedback caused by the amplifier 62 of less than unity gain, i.e., by the feedback loop formed of amplifier 62, switch S4 and OR gate 66, and defines a modified loop video signal. The slope of the decay is commensurate with the amount of offset set on the offset potentiometer 68. At point c, the waveform of FIG. 3Bc is depicted, but is not used since contact 3 of the switch S6 is open. At point d, the waveform corresponds to that of FIG. 3Bb and begins after 1p delay of the delay line 40, in the horizontal direction, and one horizontal line in the vertical direction due to delay line 14, and decays commensurate with the decay curve of the waveform 76. At point e, corresponding to the output 56, the resulting switched composite video signal of FIG. 3Be begins after 1H plus 1p delay, (i.e., 1H' delay) and decays through a selected number of feedback cycles determined by the offset of the amplifier 62. Thus, the decaying 1H' video provides the insert key via the contact 1 of the switch S6 and the insert multiplier circuit 46, and then the same 1H' decaying video signal defines the insert video via the contact 1 of switch S5.

It may be seen that the right and bottom sides of the insert 78 in FIG. 3B is greatly increased in size, with the increase commensurate with the length of decay, i.e., the number of lines that the input video signal is fed back via the feedback loop. This in turn is adjusted by the offset amplifier 62 via the offset potentiometer 68. It is found that up to 14 is a preferable number of lines of decay. Too many lines of feedback may cause deterioration in the signal-to-noise ratio. As may be seen, the fed back signal provides a border effect of substantially greater size than the prior art border of FIG. 3A, and with a distinctive decaying edge effect not previously available, rather than the "hard" edge effect.

In FIG. 3D there is shown a drop shadow effect of increased size and having a "hard" edge, generated via the invention combination of FIG. 2. Thus, switches S1, S2, S3 are "off", "on", "off", switch S4 is closed and switches S5, S6, S7 are on positions 2, 2, 1, respectively. The feedback loop is in the system to provide the OR video signal 80, FIG. 3Db, which produces the increase in size of the drop shadow 82 when compared, for example, to the generally conventional drop shadow of FIG. 3C. The OH input video signal, used as the insert key via the contact 2 of switch S6, gates off the border key to provide the foreground video signal from the OH input video via contact 2 of switch S5. The offset of the feedback loop provides the slope of the decay of the drop shadow 82 and the luminance level is maintained as selected via the border luminance control 50. The hardness of the edge of the drop shadow effect, i.e., the time it takes to switch, is determined by the gain set on the offset amplifier 52, while the length of the shadow is determined by the offset set on the amplifier 52.

Likewise, in FIG. 3F, the circuit of FIG. 2 generates a matte outline 84 of increased size with a hard edge. To this end, the switches S1, S2, S3 are turned "off", "on", "off" respectively, the switch S4 is closed, and the switches S5, S6, S7 are all on positions 3. The feedback loop of FIG. 2 again provides a decaying OR video waveform 86 at circuit point b thereof, as depicted in FIG. 3Fb. The outline key signal of FIG. 3Fc, generated at point c of the circuit, provides the insert key via the contact 3 of switch S6, which cuts the hole in the background video signal which is received via terminal 48 and passed through border multiplier 44. The insert video signal is provided as the matte video via terminal 42 and contact 3 of switch S5, in response to the insert key to the foreground multiplier circuit 46, to generate the matte outline edge effect 84 of increased size. The hardness of the edge and the length of the matte outline increase are provided via the gain and the offset levels set on the offset amplifier 52, as previously provided in the drop shadow generation of FIG. 3D.

Figure 3:
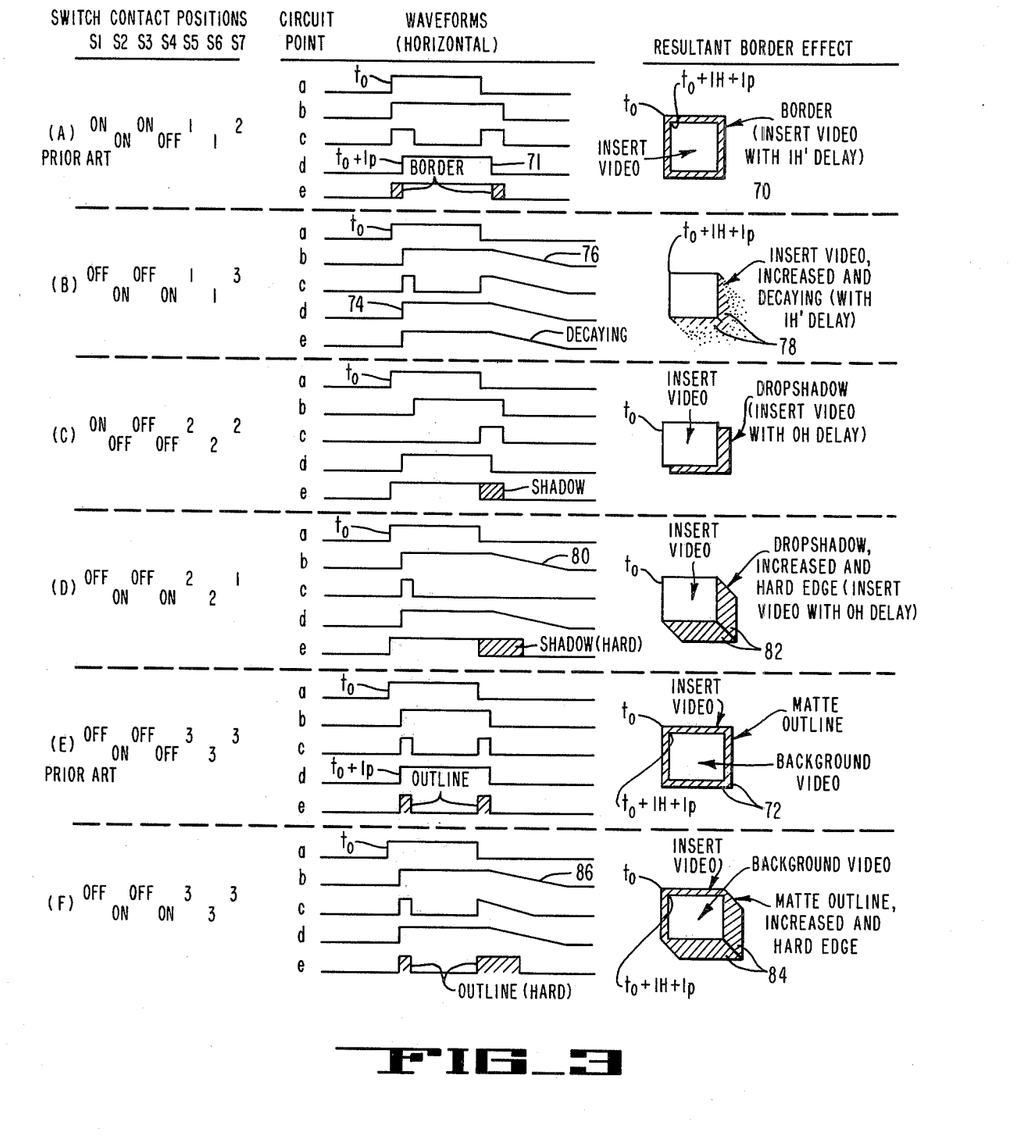
FIGS. 3A-3F are graphs depicting the comparative operations of the prior art system of FIG. 1 and of the invention system of FIG. 2, and includes the video output waveforms generated at specific points a through e in the circuits as well as the corresponding edge effects of the final, selectively switched, composite video signal output.

Although only the horizontal waveforms are depicted in the waveform column of FIG. 3 and are primarily discussed herein, it is to be understood that the vertical waveforms are also generated via the circuit of FIG. 2 in analogous manner. Thus is generated the resultant border, or edge, effects show in the last column of FIG. 3, which include both the horizontal and vertical delays. For example, as readily seen in FIG. 3F (and also in prior art results of FIGS. 3A, 3E) the insert video signal is delayed by 1 pixel in the horizontal direction and 1 horizontal line in the vertical direction, as indicated by the term $t_o+1H+1p$. In FIG. 3B, the insert video signal is delayed 1 pixel in the horizontal direction, and though not as apparent in the drawing, also is delayed 1 horizontal line in the vertical direction as depicted by the term $t_o+1H+1p$. Since the vertical relationships may be readily understood from the circuit of FIG. 2 and the discussion of the horizontal relationships herein, no further discussion thereof is included herein.

By way of further description of the invention combination, the schematic of FIGS. 4, 5 illustrates an implementation of the invention circuitry as integrally employed within the delay lines, gates, etc., of a switcher apparatus. Similar components of FIGS. 1, 2, 4 and 5 are similarly numbered, whereby the schematic of FIGS. 4, 5 may be readily compared with the block diagram of FIG. 2. To this end, the feedback loop formed of the offset amplifier 62/potentiometer 68, switch S4, and OR gate 66 is depicted in greater detail. Likewise, the arrangement of the loop relative to the various delay lines 14, 16, 20, 24, 28, 30, 40, and the various gates and switches 18, 19, 22, 26, 32, 36, is shown in greater detail in the schematic. It may be seen that the switch means 19, 38 (not shown) and 64 are formed by crosspoint circuits of the switcher apparatus. The crosspoints are typical and include the usual switchable transistors and the OR gate function depicted in FIGS. 2 (and 5) and provided by the OR gates 18, 22. In FIG. 4, the OR video signal from the OR gate 22 (FIG. 5), is fed as circuit point b to the offset amplifier 62, and thence to the switch means 64. The latter is coupled to the delay line 14 via the OR gate 66, which is in effect part of the crosspoint switch, whereby the path of the feedback loop of the invention is completed in combination with the delay lines and gates of the switcher apparatus. Since the delay line/gate circuits and their operation per se are generally known in the art as illustrated in the Ampex switcher manual of previous mention, a detailed description of the adjunct circuits of FIGS. 4, 5 is not included herein.

We claim:

1. In a switcher apparatus which receives an input video signal and generates a selectively switched composite video signal having selected edge effects about a given background or insert video signal, the apparatus having delay lines of selected horizontal line delays and of selected pixel delays coupled to AND and OR function means to provide selected combinations of the delay lines commensurate with a desired edge effect, an improved edge effects generating circuit comprising;

feedback loop means integral with the delay lines and including gate means coupled from the loop means back to the delay lines, wherein the loop means successively feeds back the input video signal to define a loop video signal waveform of selectively modified horizontal and vertical trailing edge; and
switch and multiplier means coupled to the loop means for selectively applying the modified loop video signal to the multiplier means to generate a corresponding composite video signal with the modified horizontal and vertical trailing edge effect commensurate with the desired edge effect.

2. The circuit of claim 1 wherein the feedback loop means include;

loop offset amplifier means of selected gain less than unity in response to a selectable offset setting; and
wherein said gate means include OR gate means coupled from the loop offset amplifier means back to the input of the selected delay lines.

3. The circuit of claim 2 wherein the loop offset amplifier means include;

loop offset control means for determining the degree of loop offset and thus the amount of video DC level decline with each cycle of feedback commensurate with the desired modified edge effect.

4. The circuit of claim 3 wherein said delay lines delay the input video signal a horizontal line delay vertically and a pixel delay horizontally with each cycle of feedback to provide the loop video signal with modified trailing edge.

5. The circuit of claim 4 wherein;

the loop offset amplifier means has a gain range of the order of from 0.95 to 0.99 commensurate with offsets of −50% through −5% of peak-to-peak video DC level; and said loop means include a loop switch disposed to close the loop when generating the desired modified edge effects.

6. The circuit of claim 5 wherein the switch and multiplier means include;
border and foreground multiplier circuits; and
output switch means for selectively coupling the modified loop video signal waveform to selected foreground and border multiplier circuits in response to the desired edge effect.

7. The circuit of claim 6 wherein the multiplier circuits further include;
multiplier offset control means coupled to the multiplier circuits for determining the length of the trailing edge effects of the switched composite video.

8. The circuit of claim 7 wherein the feedback loop means generates a selected insert key signal to define modified horizontal and vertical trailing edge effects of substantially increased length at the right and bottom sides thereof.

9. The circuit of claim 8 wherein a decaying edge effect of increased length is desired, wherein;
the foreground multiplier circuit is keyed by the modified loop video signal, and forms the insert video from the modified loop video signal in response to the insert key.

10. The circuit of claim 8 wherein an edge effect of a drop shadow of increased length is desired, wherein;
the foreground multiplier circuit is keyed by the input video signal, and forms the insert video from the input video signal in response to the insert key; and
the border multiplier circuit is keyed by the modified loop video signal.

11. The circuit of claim 8 wherein an edge effect of a matte outline of increased length is desired, wherein the circuit further includes;
an input source of matte video;
wherein the AND and OR function means integral with the delay lines and feedback loop means generate an outline key signal; and
wherein the foreground multiplier circuit is keyed by the outline key signal, and forms the insert video from the matte video in response to the outline key.

* * * * *

UNITED STATES PATENT AND TRADEMARK OFFICE
CERTIFICATE OF CORRECTION

PATENT NO. : 4,392,156
DATED : July 5, 1983
INVENTOR(S) : James F. Duca, Jerry A. Moline It is certified that error appears in the above-identified patent and that said Letters Patent is hereby corrected as shown below:

Column 1, line 42, change "In" to --in--.

Column 9, line 1, change "disposedto" to --disposed to--.

Signed and Sealed this

Eighth Day of October 1985

[SEAL]

Attest:

DONALD J. QUIGG

Attesting Officer

Commissioner of Patents and
Trademarks—Designate